United States Patent
Kruijt

(10) Patent No.: US 10,227,111 B2
(45) Date of Patent: Mar. 12, 2019

(54) LOWER BEARING FOR MOORING ASSEMBLY FOR A VESSEL

(71) Applicant: BLUEWATER ENERGY SERVICES B.V., Hoofddorp (NL)

(72) Inventor: Jimme Kruijt, Voorschoten (NL)

(73) Assignee: BLUEWATER ENERGY SERVICES B.V., Hoofddorp (NL)

( * ) Notice: Subject to any disclaimer, the term of this patent is extended or adjusted under 35 U.S.C. 154(b) by 0 days.

(21) Appl. No.: 15/501,687

(22) PCT Filed: Aug. 5, 2014

(86) PCT No.: PCT/EP2014/066830
§ 371 (c)(1),
(2) Date: Feb. 3, 2017

(87) PCT Pub. No.: WO2016/019980
PCT Pub. Date: Feb. 11, 2016

(65) Prior Publication Data
US 2017/0240250 A1 Aug. 24, 2017

(51) Int. Cl.
*B63B 22/02* (2006.01)
*B63B 21/50* (2006.01)
*F16C 27/02* (2006.01)

(52) U.S. Cl.
CPC ............ *B63B 22/02* (2013.01); *B63B 21/507* (2013.01); *F16C 27/02* (2013.01); *B63B 2231/00* (2013.01)

(58) Field of Classification Search
CPC ...... F16C 27/02; B63B 22/02; B63B 2231/00
See application file for complete search history.

(56) References Cited

U.S. PATENT DOCUMENTS 5,240,446 A 8/1993 Boatman
5,372,531 A 12/1994 Boatman
(Continued)

FOREIGN PATENT DOCUMENTS

| FR | 2950314 A1 * | 3/2011 | ........... B63B 21/507 |
| WO | WO-2011036407 A1 * | 3/2011 | ........... B63B 21/507 |
| WO | 2012163394 A1 | 12/2012 | |

OTHER PUBLICATIONS

International Search Report and Written Opinion for International application No. PCT/EP2014/066830, dated Apr. 28, 2015.

*Primary Examiner* — Anthony D Wiest
(74) *Attorney, Agent, or Firm* — Steven M. Koehler; Westman, Champlin & Koehler, P.A.

(57) ABSTRACT

A mooring assembly for a vessel comprises a moonpool having a casing, a turret mounted in a moonpool for a rotation by upper and lower bearing assemblies. The lower bearing assembly comprises a stiff inner bearing ring attached to a lower part of the turret, an outer bearing ring attached to a casing of the moonpool and a number of circumferentially spaced bearing blocks positioned between the inner and outer bearing rings. A mounting assembly maintains a substantially fixed position of the bearing blocks relative to the outer bearing ring but allows the bearing blocks to assume a position where the load transfer between the bearing blocks and outer bearing ring occurs with a minimum of stress concentrations within the outer bearing ring and wherein the larger part of the load transfer occurs directly between the bearing blocks and outer bearing ring without being directed through the mounting assembly.

19 Claims, 4 Drawing Sheets

(56) References Cited

U.S. PATENT DOCUMENTS

| | | |
|---|---|---|
| 5,782,197 A | 7/1998 | Pollack |
| 5,913,279 A | 6/1999 | Braud |
| 2004/0055522 A1 | 3/2004 | Boatman |
| 2013/0032072 A1 | 2/2013 | Dupont |
| 2014/0216322 A1 | 8/2014 | Ottolini |

* cited by examiner

LOWER BEARING FOR MOORING ASSEMBLY FOR A VESSEL

CROSS-REFERENCE TO RELATED APPLICATION

The present application is a national stage of and claims priority of International patent application Serial No. PCT/EP2014/066830, filed Aug. 5, 2014, and published in English as WO 2016/019980 A1, the content of which is hereby incorporated by reference in its entirety.

BACKGROUND

The discussion below is merely provided for general background information and is not intended to be used as an aid in determining the scope of the claimed subject matter.

The invention relates to a mooring assembly for a vessel, comprising a moonpool in said vessel having a casing, a turret positioned in said moonpool and mounted therein for a rotation around a turret rotation axis relative to said moonpool by means of an upper bearing assembly and a lower bearing assembly and mooring lines attached to a lower part of the turret, wherein the lower bearing assembly comprises a stiff inner bearing ring attached to said lower part of the turret, an outer bearing ring attached to the casing of the moonpool, a number of circumferentially spaced bearing blocks positioned between the inner and outer bearing rings for assuring a load transfer between the inner and outer bearing rings, and mounting means cooperating with said bearing blocks for maintaining a substantially fixed position of the bearing blocks relative to the outer bearing ring.

Apart from the mooring lines (which, for example, may comprise mooring chains) also risers (for example for oil or gas) may be attached to the lower part of the turret, as well as other equipment (for example drilling equipment). The turret allows the vessel to rotate (weathervane) in response to varying outer conditions (such as, for example, wind, waves and current) without disconnecting the mooring lines and risers. Generally the upper bearing (also sometimes referred to as main bearing) transmits most of the vertical forces (which in the major part are gravitational and acceleration forces due to the weight of the turret, mooring lines and risers). The lower bearing predominantly will be responsible for transmitting radial loads (which in the major part are mooring and riser loads) between the turret and the vessel.

The bearing blocks of the mooring assembly due to the provision of the mounting means substantially have a stationary position with respect to the outer bearing ring. In a state of the art mooring assembly the bearing blocks are housed or fixed in mountings attached to the outer bearing ring, in such a manner that the respective bearing forces between the inner bearing ring and outer bearing ring in majority are transmitted through these mountings. This, however, may lead to unfavorable conditions, among which stress concentrations at those locations in the outer bearing ring where these mountings are attached to the outer bearing ring.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

A mooring assembly includes a mounting assembly that is devised for allowing the bearing blocks to carry out a settling movement relative to the outer bearing ring for assuming a position in which the load transfer between the bearing blocks and outer bearing ring occurs with a minimum of stress concentrations within the outer bearing ring and wherein the larger part of the load transfer occurs directly between the bearing blocks and outer bearing ring without being directed through the mounting means.

Whereas the state of the art manner of mounting a bearing block to the outer bearing ring results in a rather static connection of the bearing block to the outer bearing ring, the manner in which the bearing block is attached to the outer bearing ring yields a more dynamic connection which allows the bearing block to correct (settle) its position with respect to the outer bearing ring, such that a load transfer can occur without undue stress concentrations in the outer bearing ring. Further, the mounting assembly does not play an essential role in the load transfer which now occurs directly between the inner and outer bearing rings, which also helps reducing stress concentrations in the outer bearing ring. Other advantages obtained by the present invention may relate to a reduction of welding and machining, avoidance of pocket machining and a reduction of drydock time during fabrication while maintaining inspectability and replaceability.

In one embodiment of the mooring assembly, each bearing block is provided with an outer face directly engaging an inner face of the outer bearing ring, wherein the bearing block at least at one side is provided with a pivotal connection to the outer bearing ring. The pivotal connection allows the settling movement, whereas the direct engagement between said outer face of the bearing block and the inner face of the outer bearing allows to achieve a direct load transfer.

Specifically, in such an embodiment, it is possible that said pivotal connection comprises a pivot member that with a first end is connected to said side of the bearing block and that with an opposite second end is pivotally connected to a pivot axis attached to the outer bearing ring. The pivot member may be embodied in many different manners, for example as a rod or a plate.

In another embodiment of the mooring assembly said pivotal connection comprises a flexible member that with a first end is connected to said side of the bearing block and that with an opposite second end is attached to the outer bearing ring.

In such an embodiment the flexible member defines a pivotal connection without the provision of a real pivot. Generally the connection of the flexible member to the bearing block and to the outer bearing ring will be rigid (and may occur directly or indirectly). The flexibility of the flexible member defines a "pivot".

It is conceivable that the flexible member is a flexible plate. For example, such a flexible plate may be made of spring steel material, a rubber material, a synthetic material or a material with a natural elasticity (for example steel with a limited thickness).

In one embodiment said opposite second end of the flexible member is attached to an outrigger projecting inwardly from the outer bearing ring. This provides an indirect connection of the flexible member to the outer bearing ring which may allow an easy mounting and dismounting.

In a specific embodiment of the mooring assembly said side of the bearing block which is provided with a pivotal connection to the outer bearing ring, is an upper side of the bearing block. As a result the bearing block extends downwards from the pivotal connection, which adds to the stability of the position of the bearing block.

However, it also is possible that two opposite sides of the bearing block are provided with a pivotal connection to the outer bearing ring. Such an embodiment also results in a very stable position of the bearing block, but generally makes the process of mounting or dismounting the bearing block (for example for maintenance) more complicated. Generally, the pivotal connection in such an embodiment also will allow some translation for enabling the desired settling movement.

In accordance with different embodiments, said two opposite sides may be sides facing in a circumferential direction (having the advantage of increasing the ease of mounting and dismounting because both sides are readily accessible from within the moonpool and from above the lower bearing assembly, but this embodiment may be in conflict with the desire to position adjacent bearing blocks close to each other in the circumferential direction), or may be sides facing upward and downward (allowing adjacent bearing blocks to be positioned close to each other, but generally making mounting and dismounting more complicated).

When the mounting assembly (for example the pivotal connection) is adjustable, the position of the bearing blocks already may be adjusted as much as possible during mounting, such that the required settling movements (as allowed by the mounting assembly) may be minimised.

In one embodiment of the mooring assembly, the bearing blocks have an inner surface engaging an outer surface of the inner bearing ring and an outer surface engaging an inner surface of the outer bearing ring, wherein the coefficient of friction between the inner surface of the bearing blocks and the outer surface of the inner bearing ring is smaller than the coefficient of friction between the outer surface of the bearing blocks and the inner surface of the outer bearing ring.

As a result it is assured that during a rotation of the turret within the moonpool a sliding will already occur between the bearing blocks and the inner bearing ring (where the frictional forces are lowest) before the bearing blocks would try to slide relative to the outer bearing ring (which would lead to a load on the mounting assembly). Thus circumferential loads acting on the mounting assembly are prevented or at least minimised.

Preferably, the inner bearing ring at least has an outer surface for contacting the bearing blocks which is made of a corrosive resistant hard material, such as for example steel with clad Inconel® (or similar) resulting in a low coefficient of friction. But also other surfaces of other members may be embodied in a similar manner.

In one embodiment the bearing blocks have inner and outer surfaces for contacting the inner and outer bearing rings, respectively, and wherein at least the outer surface is made of a material with a relatively low E-modulus (such as a synthetic material). It is possible too that both the inner and outer surfaces of the bearing block are made of such a material.

Although the bearing blocks may be manufactured completely of such a material, in another embodiment the bearing blocks have a metal, preferably steel, core.

In a special embodiment of the mooring assembly, the turret is flexible for bending relative to the turret rotation axis and wherein the parts of the casing connecting to the outer bearing ring are flexible for allowing a movement of the outer bearing ring relative to the moonpool, whereas the outer bearing ring itself is flexible.

The flexibility of the turret results in a situation in which radial forces mainly will be transferred by the lower bearing (and thus are not or hardly transmitted to the upper bearing with resulting large moments which generally would require increased dimensions—and thus extra weight—of such upper bearing). The turret itself and the surrounding/supporting structure also can be constructed with a lower total weight. The allowed movement of the outer bearing ring relative to the moonpool (and thus relative to the vessel) together with the relatively larger flexibility of the outer bearing ring also allow to take care of an ovalization due to deformations of the vessel (e.g. in the field known as "hogging" and "sagging"). Due to the possible settling movement of the bearing blocks, the resulting deformations of the outer bearing ring, however, will not have a negative influence on the capability of the bearing blocks to effectively transfer loads between the inner and outer bearing rings. The flexibility of the outer bearing ring further improves the correct engagement with the bearing blocks.

The turret at its lower part may comprise a stiff cylindrical plate to which the mooring lines are attached and which at its outer circumference is provided with, or shaped as, the inner bearing ring.

Such a lower plate (which in the respective field also is referred to as chain table) offers a very stable, stiff shape for the inner bearing ring.

In a favorable embodiment the engagement between the outer bearing ring and bearing block is more elastic and provides a higher coefficient of friction than the engagement between the inner bearing ring and bearing block.

BRIEF DESCRIPTION OF THE DRAWINGS

Hereinafter aspects of the invention will be elucidated while referring to the drawing, in which.

DETAILED DESCRIPTION

Figure 1:
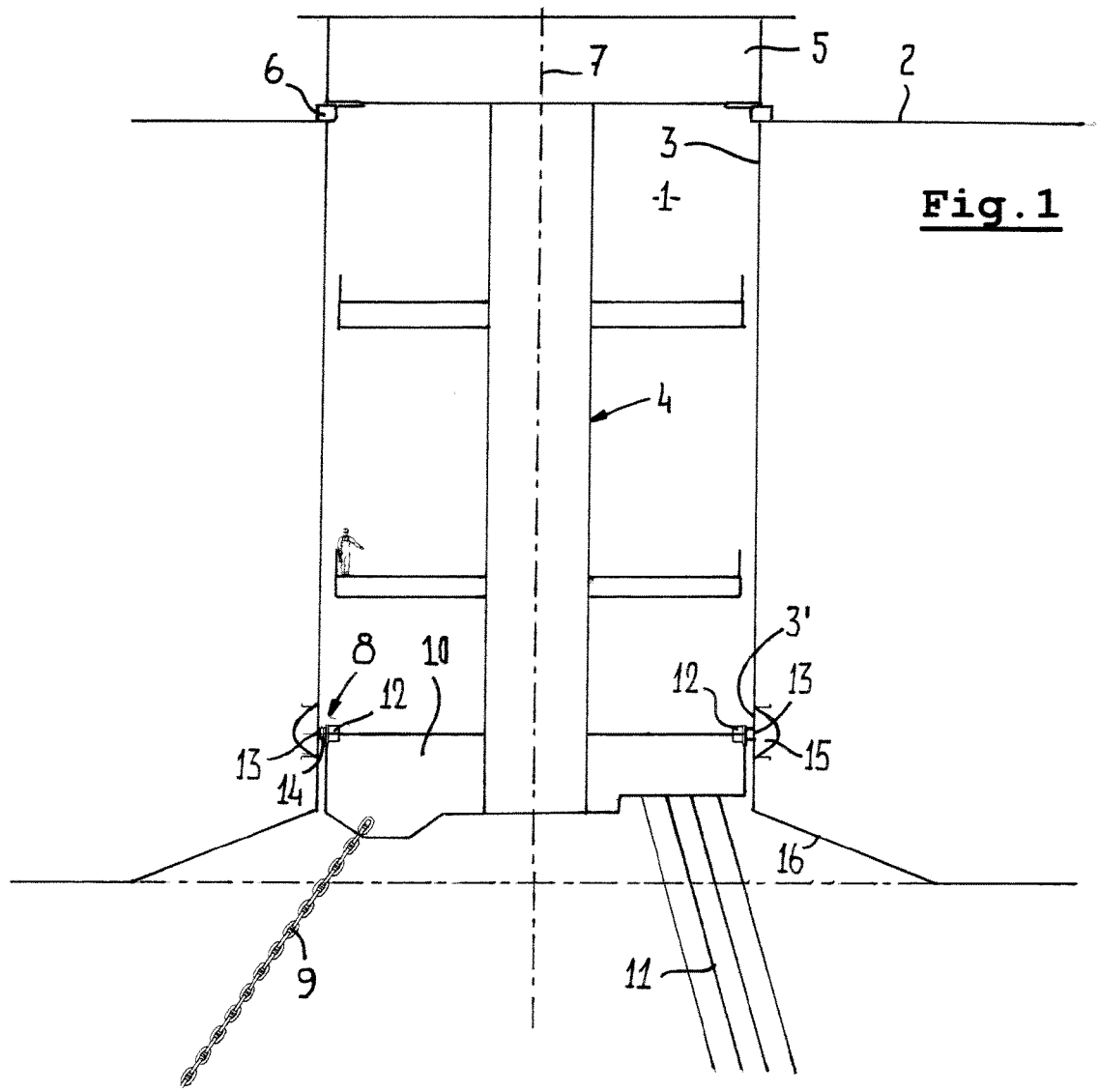
FIG. 1 schematically shows a cross section of a state of the art mooring assembly.

In FIG. 1 the basic structure of a mooring assembly for a vessel of the type the invention refers to has been illustrated schematically. Such a mooring structure comprises a moonpool 1 in the vessel 2 having a casing 3. In a practical embodiment such a moonpool 1 may, for example, have a diameter between 5 and 25 meter. Within said moonpool 1 a turret 4 is positioned. At its upper part the turret 4 comprises a turntable 5 (or similar structure) which cooperates with an upper main bearing assembly 6, such that the turret 4 is capable of a rotation relative to said moonpool 1 (and the vessel 2) around a turret rotation axis 7.

As is known per se, the turntable 5 (or other structure at the upper part of the turret 4) may carry other elements, such as a swivel, hoisting equipment etcetera. The upper main bearing assembly 6 generally will carry the major part of the weight of, and axial (vertical) forces generated by, the turret 4 and the components connected thereto and carried thereby.

At a lower part of the turret 4 a lower bearing assembly 8 is provided which generally will transfer radial loads (predominantly from mooring and risers) between the turret 4 and the casing 3 of the moonpool 1 (and thus the vessel 2). It is possible that the turret 4 has a certain flexibility for bending relative to the turret rotation axis 7.

Further mooring lines 9 (for example chains) are attached to a lower part or chain table 10 of the turret 4 (and extend to a mooring point, for example on the bottom of the sea). Said chain table 10 also generally will support risers 11 with which oil or gas is transferred to or from the vessel 2. Of course such risers 11 will extend further upward along the turret 4 towards upper equipment, such as a swivel as mentioned above, but this has not been illustrated as it is known in this field and is not relevant for understanding the present invention. Also other equipment (e.g. drilling equipment) may be supported by the chain table 10.

The lower bearing assembly 8 basically comprises a stiff inner bearing ring 12 attached to the chain table 10, an outer bearing ring 13 attached to the casing 3 of the moonpool 1 and a number of circumferentially spaced bearing blocks 14 positioned between the inner and outer bearing rings 12,13 for assuring a load transfer between the inner and outer bearing rings. The inner bearing ring 12 may at least have an outer surface for contacting the bearing blocks 14 which is made of a corrosive resistant hard material, such as for example steel with clad Inconel® (or similar) resulting in a low coefficient of friction.

As a result of specific constructional measures, for example cut-outs 15 in a vessel structure 16 immediately adjacent the outer bearing ring 13, parts 3' of the casing 3 connecting to the outer bearing ring 13 are flexible for allowing a limited movement of the outer bearing ring 13 relative to the moonpool 1. Further the outer bearing ring 13 itself is flexible for allowing it to assume a non-circular shape.

Not visible in FIG. 1, but further discussed with respect to the following figures, is mounting assembly cooperating with the bearing blocks 14 for maintaining a substantially fixed position of the bearing blocks 14 relative to the outer bearing ring 13. Such a mounting assembly is state of the art, but in accordance with the present invention have a specific design.

Figure 2:
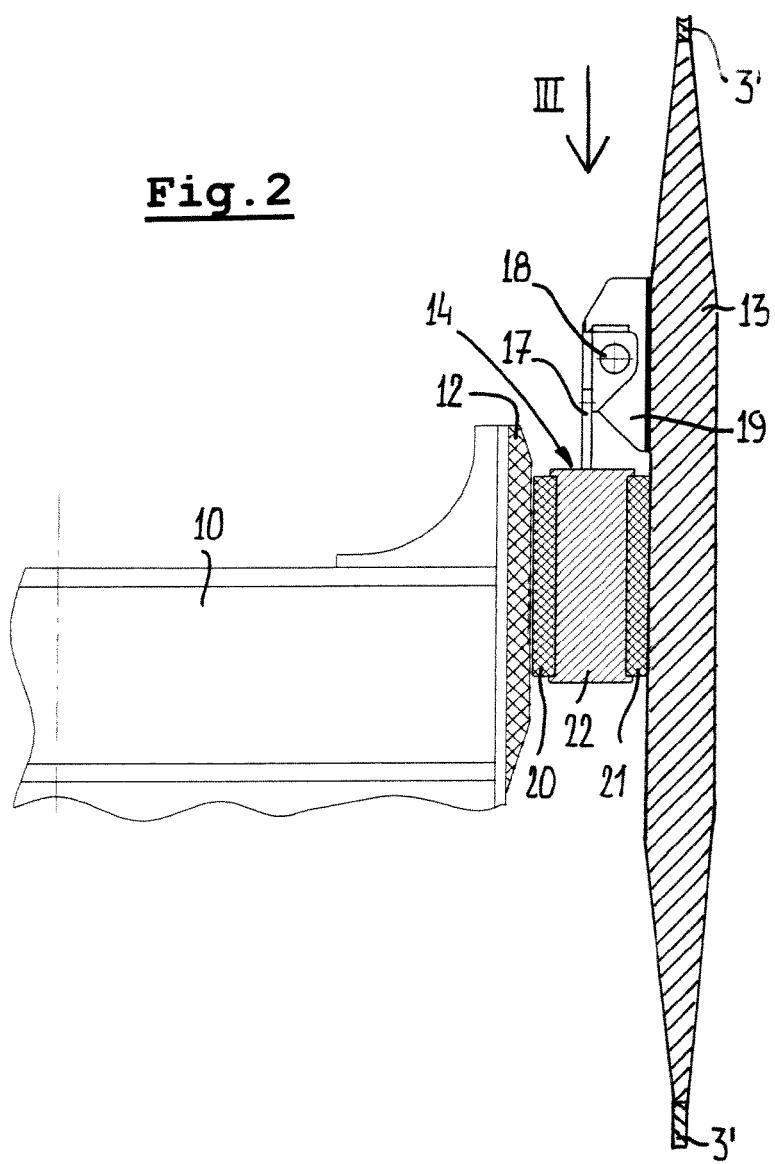
FIG. 2 illustrates a radial cross section of a part of a mooring assembly according to the present invention in a first embodiment.
Figure 3:
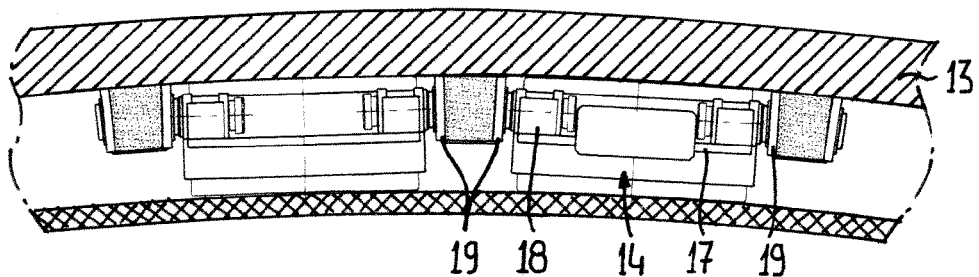
FIG. 3 is a view according to III in FIG. 2.

In FIGS. 2 and 3 a first embodiment of such a mounting assembly is illustrated. At its upper side the bearing block 14 comprises a plate 17 which with its upper end is pivotally connected to a pivot axis 18 that is supported by outriggers 19 attached to and projecting inwardly from the outer bearing ring 13. As a result the mounting assembly is devised for allowing the bearing blocks 14 to carry out a settling movement relative to the outer bearing ring 13 for assuming a position in which the load transfer between the bearing blocks 14 and the outer bearing ring 13 occurs with a minimum of stress concentrations within the outer bearing ring 13.

It is noted that although such settling movements are here a result of some kind of pivoting movement, it also is conceivable that such settling movements are a result of other types of movements, for example translations (as provided by respective translation mechanisms).

As one can see clearly in FIG. 2, the bearing block 14 is provided with an outer face directly engaging an inner face of the outer bearing ring 13. As a result the larger part of the load transfer occurs directly between the bearing block 14 and outer bearing ring 13 without being directed through the mounting means (plate 17, pivot axis 18 and outriggers 19).

It is noted that the plate 17 also may be substituted by another part, such as for example a rod.

The bearing block 14 has an inner plate 20 (for example made of a synthetic or other bearing material) with an inwardly directed surface for engaging an outer surface of the inner bearing ring 12 (which, as mentioned above, may be made of a corrosive resistant hard material, such as for example steel with clad Inconel® (or similar) resulting in a low coefficient of friction), and an outer plate 21 (for example also made of elastic material) with an outwardly directed surface engaging an inner surface of the outer bearing ring 13. Preferably the coefficient of friction between the inner surface of the inner plate 20 and the outer surface of the inner bearing ring 12 is smaller than the coefficient of friction between the outer surface of the outer plate 21 and the inner surface of the outer bearing ring 13.

In the embodiment illustrated in FIG. 2 a core 22 (for example made of a metal, such as steel) is positioned between the inner plate 20 and outer plate 21. In another embodiment (not illustrated) such a core 22 may be omitted.

Figure 4:
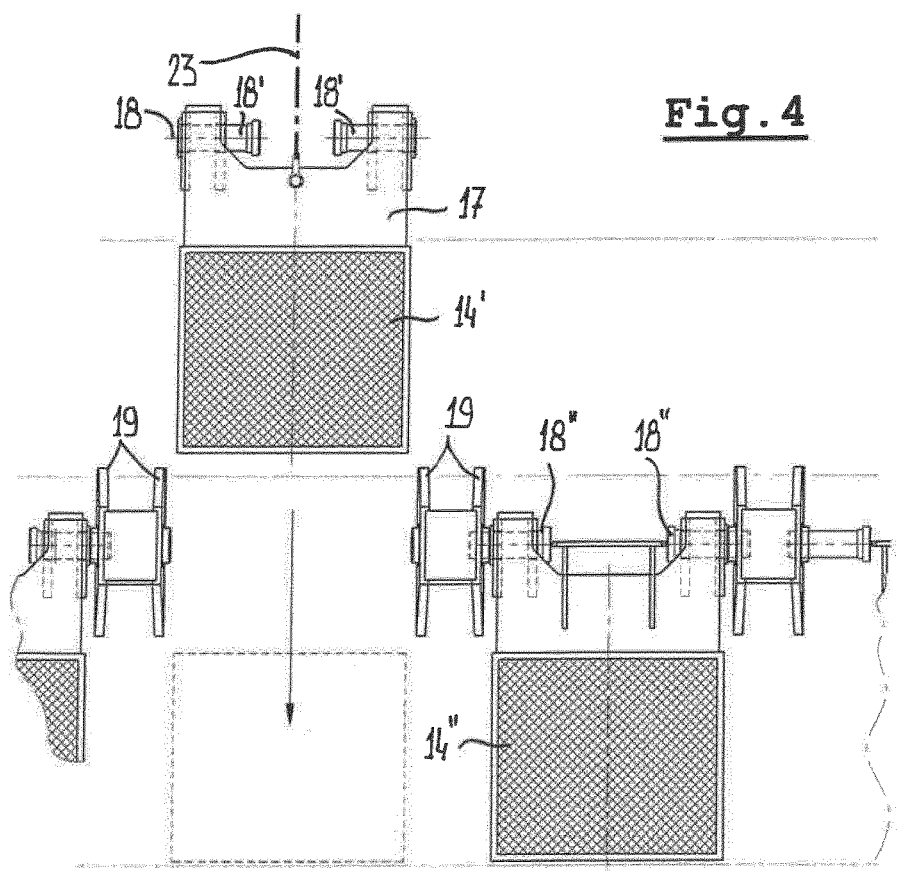
FIG. 4 illustrates a manner of mounting a bearing block.

FIG. 4 illustrates an example of a mounting process of a bearing block 14. The pivot axis 18 is defined by two shiftable pins 18'. In a position in which the pins 18' are shifted towards each other (see bearing block 14'), the bearing block is lowered between two outriggers 19 (for example using a hoisting line 23 of a hoisting mechanism which may be attached to the casing 3 at a higher level in the moonpool 1). Once lowered and in the correct position between the outriggers 19, the pins 18' are shifted away from each other and fixed (as represented by pins 18" of bearing block 14").

Figure 5:
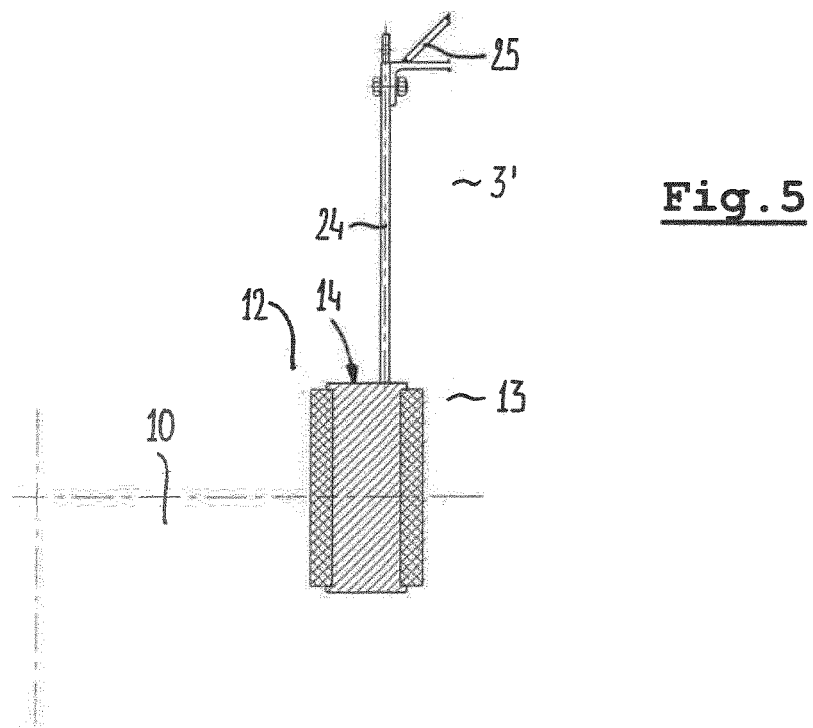
FIGS. 5-8 schematically and partly show alternative embodiments.

FIG. 5 illustrates very schematically a different embodiment, in which the movable connection between the bearing block 14 and outer bearing ring 13 (or adjacent casing part 3') which allows a settling, comprises a flexible member 24, for example a flexible plate, that with a first, here lower, end is connected to the upper side of the bearing block 14 and that with an opposite second, here upper, end is attached to the outer bearing ring 13 (directly or, as illustrated here, through an additional member, such as an outrigger 25 and casing part 3').

Figure 6:
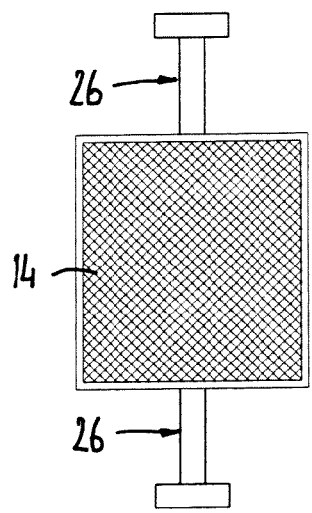
Figure 7:
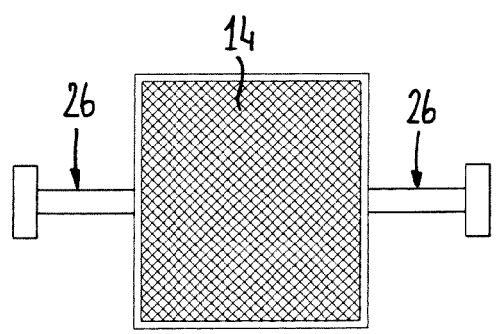

FIGS. 6 and 7 illustrate two different embodiments in which not only one but two, opposite, sides of the bearing block 14 are provided with mounting means 26 for providing a movable connection to the outer bearing ring 13. In FIG. 6 said opposite sides are sides facing upward and downward, and in FIG. 7 said opposite sides are sides facing in a circumferential direction. The mounting means 26 may have different embodiments.

Figure 8:
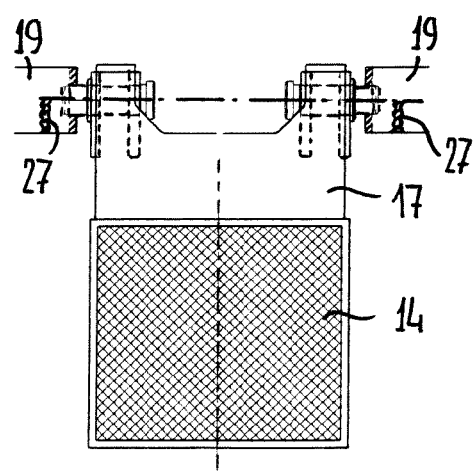

Finally, FIG. 8 is provided for schematically showing the possibility that the mounting assembly (or movable connection) is adjustable. In the illustrated embodiment the bearing block 14 is attached to plate 17 which may pivot around pivot axis 18 which is supported in outriggers 19. As indicated schematically by setting screws 27, the position and/or orientation of the pivot axis 18 may be changed (it is noted that such a setting may occur in any direction, notwithstanding the present illustration which basically shows a setting in a vertical direction). After the required position of the pivot axis 18, and thus of the bearing block 14, has been achieved a (semi) permanent chocking may be carried out, for example using a chocking material such as an epoxy resin named Chockfast Orange®. Of course such an adjustment of the bearing blocks 14 also may be carried out with other embodiments of the mounting assembly.

The invention is not limited to the embodiments described before which may be varied widely within the scope of the invention as defined by the appending claims. Thus, although the bearing blocks are described as being carried by the outer bearing ring, it also is conceivable that they are carried by a casing part immediately adjacent the outer bearing ring. Further, although the invention is defined with respect to a vessel comprising a moonpool, its principles and scope too apply to a situation in which no classic moonpool is provided but in which the vessel comprises an extension which acts in a manner similar to such a moonpool. Finally it is noted, that the present invention also intends to cover embodiments in which the inner ring has taken the functional place, and is provided with the functional properties of the outer ring as described above, and vice versa (and thus are interchanged in a functional manner). Thus, in such embodiments the mounting means may be devised for allowing the bearing blocks to carry out a settling movement relative to the inner bearing ring for assuming a position in which the load transfer between the bearing blocks and inner bearing ring occurs with a minimum of stress concentrations within the inner bearing ring and wherein the larger part of the load transfer occurs directly between the bearing blocks and inner bearing ring without being directed through the mounting means. Further, in such embodiments the engagement between the inner bearing ring and bearing block may be more elastic and provide a higher coefficient of friction than the engagement between the outer bearing ring and bearing block.

The invention claimed is:

1. A mooring assembly for a vessel, comprising a moonpool in said vessel having a casing, a turret positioned in said moonpool and mounted therein for a rotation around a turret rotation axis relative to said moonpool by an upper bearing assembly and a lower bearing assembly and mooring lines attached to a lower part of the turret, wherein the lower bearing assembly comprises an inner bearing ring attached to said lower part of the turret, an outer bearing ring attached to the casing of the moonpool, a number of circumferentially spaced bearing blocks positioned between the inner and outer bearing rings to transfer a load between the inner and outer bearing rings, wherein each bearing block is non-rotatable with respect to the inner and outer bearing rings and has an inner surface directly engaging only an outer surface of the inner bearing ring and a separate, different, opposite facing outer surface directly engaging only an inner surface of the outer bearing ring, and a mounting assembly cooperating with said bearing blocks configured to maintain a substantially fixed position of the bearing blocks relative to the outer bearing ring, wherein the mounting assembly is configured to allow the bearing blocks to carry out a settling movement relative to the outer bearing ring to assume a position in which load transfer between the separate, different, opposite outer surface of the bearing blocks and the inner surface of the outer bearing ring occurs with a minimum of stress concentrations within the outer bearing ring and wherein a larger part of the load transfer occurs directly between the separate, different, opposite outer surface of the bearing blocks and the inner surface of the outer bearing ring without being directed through the mounting assembly, and wherein each bearing block at least at one side is provided with a pivotal connection to the outer bearing ring, wherein a pivot axis of each bearing block is orthogonal to a radius of the turret rotation axis extending through the bearing block.

2. The mooring assembly according to claim 1, wherein said pivotal connection comprises a pivot member that with a first end is connected to said side of the bearing block and that with an opposite second end is pivotally connected to a pivot axis attached to the outer bearing ring.

3. The mooring assembly according to claim 2, wherein the pivot member is a rod or plate.

4. The mooring assembly according to claim 1, wherein said pivotal connection comprises a member that with a first end is connected to said side of the bearing block and that with an opposite second end is not pivotally attached to the outer bearing ring and that is sufficiently flexible to allow the settling movement of the bearing blocks.

5. The mooring assembly according to claim 4, wherein the member is a plate.

6. The mooring assembly according to claim 4, wherein said opposite second end of the member is attached to an outrigger projecting inwardly from the outer bearing ring.

7. The mooring assembly according to claim 1, wherein said side of the bearing block which is provided with a pivotal connection to the outer bearing ring, is an upper side of the bearing block.

8. The mooring assembly according to claim 1, wherein two opposite sides of the bearing block are provided with a pivotal connection to the outer bearing ring.

9. The mooring assembly according to claim 8, wherein said two opposite sides are sides facing in a circumferential direction, or are sides facing upward and downward.

10. The mooring assembly according to claim 1, wherein the mounting assembly is adjustable.

11. The mooring assembly according to claim 1, wherein a coefficient of friction between the inner surface of the bearing blocks and the outer surface of the inner bearing ring is smaller than the coefficient of friction between the outer surface of the bearing blocks and the inner surface of the outer bearing ring.

12. The mooring assembly according to claim 1, wherein the inner bearing ring at least has an outer surface for contacting the inner surface of the bearing blocks which is made of a corrosive resistant material.

13. The mooring assembly according to claim 1, wherein at least the outer surface of the bearing block is made of a synthetic material.

14. The mooring assembly according to claim 13, wherein both the inner and outer surfaces of the bearing block are made of synthetic material.

15. The mooring assembly according to claim 13, wherein the bearing blocks have a metal core.

16. The mooring assembly according to claim 1, wherein the turret is flexible being configured to allow a bending relative to the turret rotation axis and wherein parts of the casing connecting to the outer bearing ring are flexible being configured to allow a movement of the outer bearing ring relative to the moonpool, wherein the outer bearing ring is flexible so as to assume a non-circular shape.

17. The mooring assembly according to claim 1, wherein the turret at its lower part comprises a cylindrical plate to which the mooring lines are attached and which at its outer circumference is provided with, or shaped as, the inner bearing ring.

18. The mooring assembly according to claim 1, wherein engagement between the outer bearing ring and bearing block is more elastic and provides a higher coefficient of friction than the engagement between the inner bearing ring and bearing block.

19. The mooring assembly according to claim 1, wherein the inner and outer bearing rings are interchanged in a functional manner.

* * * * *